United States Patent
Mishina et al.

(10) Patent No.: US 12,081,655 B2
(45) Date of Patent: Sep. 3, 2024

(54) SECRET SIGMOID FUNCTION CALCULATION SYSTEM, SECRET LOGISTIC REGRESSION CALCULATION SYSTEM, SECRET SIGMOID FUNCTION CALCULATION APPARATUS, SECRET LOGISTIC REGRESSION CALCULATION APPARATUS, SECRET SIGMOID FUNCTION CALCULATION METHOD, SECRET LOGISTIC REGRESSION CALCULATION METHOD, AND PROGRAM

(71) Applicant: NIPPON TELEGRAPH AND TELEPHONE CORPORATION, Tokyo (JP)

(72) Inventors: Ibuki Mishina, Musashino (JP); Dai Ikarashi, Musashino (JP); Koki Hamada, Musashino (JP); Ryo Kikuchi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 127 days.

(21) Appl. No.: 17/281,245

(22) PCT Filed: Sep. 25, 2019

(86) PCT No.: PCT/JP2019/037451
§ 371 (c)(1),
(2) Date: Mar. 30, 2021

(87) PCT Pub. No.: WO2020/071187
PCT Pub. Date: Apr. 9, 2020

(65) Prior Publication Data
US 2022/0006614 A1    Jan. 6, 2022

(30) Foreign Application Priority Data
Oct. 4, 2018  (JP) .................................. 2018-189296

(51) Int. Cl.
H04L 9/08       (2006.01)
G06F 7/556      (2006.01)

(52) U.S. Cl.
CPC .............. *H04L 9/085* (2013.01); *G06F 7/556* (2013.01); *H04L 2209/46* (2013.01)

(58) Field of Classification Search
None
See application file for complete search history.

(56) References Cited

U.S. PATENT DOCUMENTS 10,491,373 B2 *  11/2019  Jain ......................... H04L 9/008
11,087,223 B2 *   8/2021  Nandakumar .......... H04L 9/008
(Continued)

FOREIGN PATENT DOCUMENTS

CA        3072638 A1 *  3/2019  ........... G06F 17/147
WO   WO-2018174873 A1 *  9/2018  ............. G06F 21/62

OTHER PUBLICATIONS

Riazi, M. Sadegh; Weinert, Christian; Tkachenko, Oleksandr; Songhori, Ebrahim; Schneider, Thomas; Koushanfar, Farinaz; Chameleon: A Hybrid Secure Computation Framework for Machine Learning Application; pp. 1-15; Jan. 2018 (Year: 2018).*

(Continued)

*Primary Examiner* — Saleh Najjar
*Assistant Examiner* — Shadi H Kobrosli
(74) *Attorney, Agent, or Firm* — XSENSUS LLP

(57) ABSTRACT

A technique for performing secure computation of a sigmoid function with high speed and precision is provided. A secret sigmoid function calculation system is a system, in which g(x) is assumed to be a secure computable function, which calculates, from a share $[[x]]$ of an input value x, a share $[[\sigma'(x)]]$ of a value of a sigmoid function for the input value x, and includes: a first comparing means that generates a first comparison result $[[c_1]]=\text{less\_than}([[x]], t_1)$; a second com- (Continued)

paring means that generates a second comparison result $[[d]]=\text{greater\_than}([[x]], t_0)$; a first logical computation means that generates a first logical computation result $[[e]]=\text{not}([[c]])$; a second logical computation means that generates a second logical computation result $[[k]]=\text{and}([[c]], [[d]])$ or $[[k]]=\text{mul}([[c]], [[d]])$; and a function value calculating means that calculates the share $[[\sigma'(x)]]=\text{mul}([[k]], [[g(x)]])+[[e]]$.

15 Claims, 6 Drawing Sheets

(56) References Cited

U.S. PATENT DOCUMENTS

| | | | |
|---|---|---|---|
| 11,562,230 B2* | 1/2023 | Mohassel | H04L 9/008 |
| 2019/0228299 A1* | 7/2019 | Chandran | G06N 3/04 |

OTHER PUBLICATIONS

Mohassel, Payman; Zhang, Yupeng; SecureML: A System for Scalable Privacy-Preserving Machine Learning; pp. 1-28; 2017 (Year: 2017).*

Shi, H., Jiang, C., Dai, W. et al. Secure Multi-pArty Computation Grid LOgistic REgression (SMAC-GLORE). BMC Med Inform Decis Mak 16 (Suppl 3), 89 (2016). https://doi.org/10.1186/s12911-016-0316-1 (Year: 2016).*

Mishina et al., "Designs and Implementations of Efficient and Accurate Secret Logistic Regression", Computer Security Symposium 2018, Oct. 22-25, 2018, pp. 1229-1236 (17 pages including English Translation).

Mohassel et al., "SecureML: A System for Scalable Privacy-Preserving Machine Learning", 2017 IEEE Symposium on Security and Privacy, 2017, pp. 19-38.

* cited by examiner

| SECRET SIGMOID FUNCTION CALCULATION ALGORITHM |
|---|
| INPUT: $[[x]]$ <br> PARAMETERS: $t_0$, $t_1$, a, b <br> OUTPUT: $[[\sigma'(x)]]$ <br> 1: $[[c]] \leftarrow \text{less\_than}([[x]], t_1)$ <br> 2: $[[d]] \leftarrow \text{greater\_than}([[x]], t_0)$ <br> 3: $[[e]] \leftarrow \text{not}([[c]])$ <br> 4: $[[k]] \leftarrow \text{and}([[c]], [[d]])$ <br> 5: $[[\sigma'(x)]] \leftarrow \text{mul}([[k]], a[[x]]+b)+[[e]]$ |

| SECRET LOGISTIC REGRESSION CALCULATION ALGORITHM |
|---|

INPUT: $[[\vec{x_i}]], [[y_i]]$ $(0 \leq i \leq m-1)$
PARAMETERS: $\eta, T$
OUTPUT: $[[\vec{w}]]$
 1: SET INITIAL VALUE $[[\vec{w_0}]]$ OF $[[\vec{w}]]$
 2: $a \leftarrow 1/m$
 3: $t \leftarrow 0$
 4: while $t<T$ do
 5:    $i \leftarrow 0$
 6:    while $i<m$ do
 7:      $[[b_i]] \leftarrow \text{hpsum}([[\vec{w_t}]], [[(1, \vec{x_i})]])$
 8:      $[[c_i]] \leftarrow \text{Sigmoid}([[b_i]])$
 9:      $[[d_i]] \leftarrow [[c_i]]-[[y_i]]$
10:      $i \leftarrow i+1$
11:    end while
12:    $j \leftarrow 0$
13:    while $j<n+1$ do
14:      $[[e]] \leftarrow \sum_{i=0}^{m-1} [[d_i]][[x_{i,j}]]$
15:      $[[w_{j,t+1}]] \leftarrow [[w_{j,t}]]-\eta a[[e]]$
16:      $j \leftarrow j+1$
17:    end while
18:    $t \leftarrow t+1$
19: end while

FIG. 3

SECRET SIGMOID FUNCTION CALCULATION SYSTEM, SECRET LOGISTIC REGRESSION CALCULATION SYSTEM, SECRET SIGMOID FUNCTION CALCULATION APPARATUS, SECRET LOGISTIC REGRESSION CALCULATION APPARATUS, SECRET SIGMOID FUNCTION CALCULATION METHOD, SECRET LOGISTIC REGRESSION CALCULATION METHOD, AND PROGRAM

CROSS-REFERENCE TO RELATED APPLICATIONS

The present application is based on PCT filing PCT/JP2019/037451, filed Sep. 25, 2019, which claims priority to JP 2018-189296, filed Oct. 4, 2018, the entire contents of each are incorporated herein by reference.

TECHNICAL FIELD

The present invention relates to secure computation techniques and, in particular, relates to a technique for performing secure computation of a sigmoid function.

BACKGROUND ART

As an existing method for performing secure computation of a sigmoid function, there is a method described in Non-patent Literature 1.

Secure computation is a method for obtaining the computation result of a designated computation without reconstructing the encrypted numerical values (see, for example, Reference Non-patent Literature 1). With the method of Reference Non-patent Literature 1, it is possible to perform encryption by which a plurality of pieces of information, whose numerical values can be reconstructed, are distributed over three secure computation apparatuses and make the three secure computation apparatuses hold the results of addition and subtraction, constant addition, multiplication, constant multiplication, logical operations (a NOT, an AND, an OR, and an XOR), and data format conversion (an integer or a binary) with the results being distributed over these secure computation apparatuses, that is, in an encrypted state, without reconstructing the numerical values. In general, the number of secure computation apparatuses over which the information is distributed is not limited to 3 and can be set at W (W is a predetermined constant greater than or equal to 3), and a protocol that implements secure computation by cooperative computations by W secure computation apparatuses is called a multi-party protocol.

(Reference Non-patent Literature 1: Koji Chida, Koki Hamada, Dai Ikarashi, and Katsumi Takahashi, "A Three-party Secure Function Evaluation with Lightweight Verifiability Revisited", In CSS, 2010.)

PRIOR ART LITERATURE

Non-Patent Literature

Non-patent Literature 1: Payman Mohassel and Yupeng Zhang, "SecureML: A System for Scalable Privacy-Preserving Machine Learning", In IEEE Symposium on Security and Privacy (SP) 2017, pp. 19-38, 2017.

SUMMARY OF THE INVENTION

Problems to be Solved by the Invention

However, a sigmoid function is a nonlinear function which is expressed by the following formula (see FIG. 1) and it is not easy to perform secure computation thereof while achieving precision and processing speed at the same time.

$$\sigma(x)=1/(1+\exp(-x)) \tag{1}$$

For example, in the method described in Non-patent Literature 1, processing can be performed at a relatively high speed because a function using the fact that ½ can be processed at high speed over a ring of integers and a logic circuit is used; however, the accuracy of approximation is low because a function whose principal purpose is not approximation of a sigmoid function and which gives high priority to processing speed is used.

Therefore, an object of the present invention is to provide a technique for performing secure computation of a sigmoid function with high speed and precision.

Means to Solve the Problems

An aspect of the present invention is a secret sigmoid function calculation system, in which $t_0$ and $t_1$ are assumed to be real numbers that satisfy $t_0<t_1$ and $g(x)$ is assumed to be a secure computable function, which is configured with three or more secret sigmoid function calculation apparatuses and calculates, from a share $[[x]]$ of an input value x, a share $[[\sigma'(x)]]$ of a value of a sigmoid function for the input value x. The secret sigmoid function calculation system includes: a first comparing means that generates a first comparison result $[[c]]$ by $[[c]]=\text{less\_than}([[x]], t_1)$ from the share $[[x]]$; a second comparing means that generates a second comparison result $[[d]]$ by $[[d]]=\text{greater\_than}([[x]], t_0)$ from the share $[[x]]$; a first logical computation means that generates a first logical computation result $[[e]]$ by $[[e]]=\text{not}([[c]])$ from the first comparison result $[[c]]$; a second logical computation means that generates a second logical computation result $[[k]]$ by $[[k]]=\text{and}([[c]], [[d]])$ or $[[k]]=\text{mul}([[c]], [[d]])$ from the first comparison result $[[c]]$ and the second comparison result $[[d]]$; and a function value calculating means that calculates the share $[[\sigma'(x)]]$ by $[[\sigma'(x)]]=\text{mul}([[k]], [[g(x)]])+[[e]]$ from the share $[[x]]$, the first logical computation result $[[e]]$, and the second logical computation result $[[k]]$.

Effects of the Invention

According to the present invention, it is possible to perform secure computation of a sigmoid function with high speed and precision.

BRIEF DESCRIPTION OF THE DRAWINGS

FIG. 3 is a diagram showing a secret logistic regression calculation algorithm.

DETAILED DESCRIPTION OF THE EMBODIMENTS

Figures 1, 2:
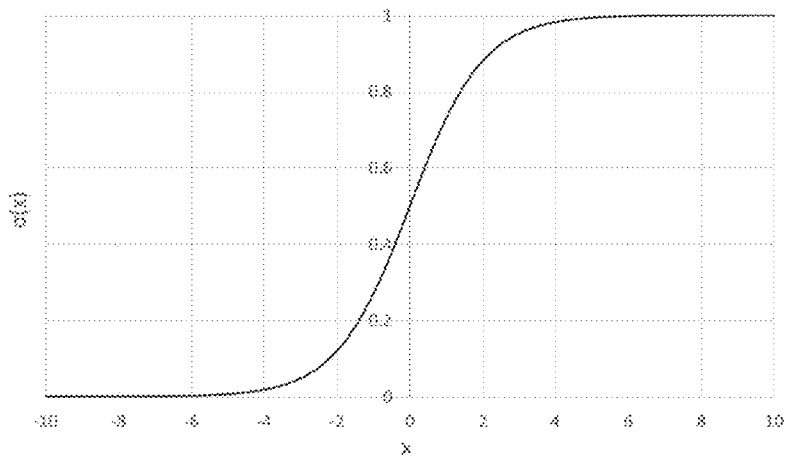
FIG. 1 is a graph showing a sigmoid function a(x).
FIG. 2 is a diagram showing a secret sigmoid function calculation algorithm.

Hereinafter, embodiments of the present invention will be described in detail. It is to be noted that constituent units having the same function are denoted by the same reference character and overlapping explanations are omitted.

A secret sigmoid function calculation algorithm and a secret logistic regression calculation algorithm, which will be described later, are constructed of a combination of computations on the existing secure computation. Computations required by these algorithms include concealment, addition, multiplication, magnitude comparison, logical operations (a NOT and an AND), and hpsum. Here, hpsum is the sum of products. Hereinafter, each computation will be described.

Computations

Concealment

Assume that $[[x]]$ is a value (hereinafter referred to as a share of x) obtained by concealing x by secret sharing. Any method can be used as a secret sharing method. For example, Shamir's secret sharing over $GF(2^{61}-1)$ or replicated secret sharing over $Z_2$ can be used.

A plurality of secret sharing methods may be combined and used in a certain algorithm. In this case, it is assumed that the secret sharing methods are mutually converted as appropriate.

Moreover, assume that $[[\vec{x}]]=([[x_0]], \ldots, [[x_{n-1}]])$ for an n-dimensional vector $\vec{x}=(x_0, \ldots, x_{n-1})$.

It is to be noted that x is referred to as plaintext of $[[x]]$.

As a method for obtaining $[[x]]$ from x (concealment) and a method for obtaining x from $[[x]]$ (reconstruction), specifically, there are methods described in Reference Non-patent Literature 1 and Reference Non-patent literature 2.

(Reference Non-patent Literature 2: Shamir, A., "How to share a secret", Communications of the ACM, Vol. 22, No. 11, pp. 612-613, 1979.)

Addition and Multiplication

Addition $[[x]]+[[y]]$ by secure computation uses $[[x]]$ and $[[y]]$ as input and outputs $[[x+y]]$. Multiplication $[[x]]\times[[y]]$ (mul($[[x]], [[y]]$)) by secure computation uses $[[x]]$ and $[[y]]$ as input and outputs $[[x\times y]]$.

Here, either one of $[[x]]$ and $[[y]]$ may be a value that is not concealed (hereinafter referred to as a public value). For example, a configuration can be adopted in which, on the assumption that β and γ are public values, $[[x]]$ and β are used as input and $[[x+β]]$ is output or γ and $[[y]]$ are used as input and $[[\gamma \times y]]$ is output.

As specific methods of addition and multiplication, there are methods described in Reference Non-patent Literature 3 and Reference Non-patent Literature 4.

(Reference Non-patent Literature 3: Ben-Or, M., Goldwasser, S. and Wigderson, A., "Completeness theorems for non-cryptographic fault-tolerant distributed computation", Proceedings of the twentieth annual ACM symposium on Theory of computing, ACM, pp. 1-10, 1988.)

(Reference Non-patent Literature 4: Gennaro, R., Rabin, M. O. and Rabin, T., "Simplified VSS and fast-track multiparty computations with Applications to threshold cryptography", Proceedings of the seventeenth annual ACM symposium on Principles of distributed computing, ACM, pp. 101-111, 1998.)

Magnitude Comparison

Secure computation less_than($[[x]]$, t) (t is a public value) uses $[[x]]$ as input and outputs $[[[x<t]]]$. Secure computation greater_than($[[x]]$, t) (t is a public value) uses $[[x]]$ as input and outputs $[[[x>t]]]$. [.] represents a predicate. For example, [x<t] represents a predicate meaning that "x is less than t"; $[[[x<t]]]=[[1]]$ holds if "x is less than t" is true and $[[[x<t]]]=[[0]]$ holds if "x is less than t" is false.

Logical Operations

A NOT $\neg[[x]]$ by secure computation uses $[[x]]$ as input and outputs $[[\neg x]]$. An AND and($[[x]], [[y]]$) by secure computation uses $[[x]]$ and $[[y]]$ as input and outputs $[[\text{and}(x, y)]]$.

hpsum

Secure computation hpsum($([[\vec{x}]], [[\vec{y}]])$) uses $[[\vec{x}]]$ and $[[\vec{y}]]$ (where $\vec{x}=(x_0, \ldots, x_{n-1})$ and $\vec{y}=(y_0, \ldots, y_{n-1})$) as input and outputs $[[\Sigma_{j=0}^{n-1} x_j y_j]]$, that is, outputs the sum of products of j-th elements of two vectors.

Technical Background

Approximate Sigmoid Function

A sigmoid function σ(x) is a monotonically increasing function as shown in FIG. 1. Moreover, the sigmoid function σ(x) has properties: $\lim_{x \to \infty} \sigma(x)=1$ and $\lim_{x \to -\infty} \sigma(x)=0$. As is clear also from FIG. 1, σ(x) is approximately 1 when x is greater than or equal to 5 and σ(x) is approximately 0 when x is less than or equal to −5. Furthermore, the value of σ(x) increases linearly between a portion where the value of σ(x) is approximately 0 and a portion where the value of σ(x) is approximately 1 (in particular, near x=0) and, with attention paid only to this portion, it is clear that there is a possibility that, even if the sigmoid function σ(x) is approximated by a simple function (for example, a linear function), commensurate accuracy of approximation can be achieved.

Therefore, with consideration given to this feature of the sigmoid function σ(x), the sigmoid function σ(x) is approximated using three formulae in accordance with the value of x. That is, a function σ'(x) (hereinafter referred to as an approximate sigmoid function σ'(x)) that approximates the sigmoid function σ(x) is defined by the following formula.

$$\sigma'(x) = \begin{cases} 1 & (x \geq t_1) \\ g(x) & (t_0 < x < t_1) \\ 0 & (x \leq t_0) \end{cases} \quad (2)$$

As is clear from the formula (2), σ'(x) is a function that is 1 when x is greater than or equal to a threshold $t_1$, that is 0 when x is less than or equal to a threshold $t_0$, and that approximates σ(x) by a predetermined function g(x) when x is located between the threshold $t_0$ and the threshold $t_1$.

The approximate sigmoid function σ'(x) can be expressed as one formula like the following formula by using the fact that a conditional branch expression "IF γ THEN α ELSE β" can be expressed by a mathematical formula "γα+(1−γ)β".

$$\sigma'(x) = cdg(x) + (\neg c) \quad (3)$$

Here, $c=[x<t_1]$ and $d=[x>t_0]$. Thus, c and d are 1 when the formulae in brackets are true and c and d are 0 when the formulae in brackets are false. It is to be noted that the formula (3) can also be expressed as the following formula because and(c, d)=cd.

$$\sigma'(x) = \text{and}(c,d)g(x) + (\neg c) \quad (3)'$$

For example, the function g(x) that is used to define the approximate sigmoid function σ'(x) can be set as a linear function g(x)=ax+b.

Algorithm

The following description deals with an algorithm (a secret sigmoid function calculation algorithm) that performs secure computation of the sigmoid function using the approximate sigmoid function σ'(x). The secret sigmoid function calculation algorithm uses the share [[x]] of x as input, calculates [[σ'(x)]] using the parameters $t_0$ and $t_1$ and the secure computable function g(x), and outputs [[σ'(x)]]. Here, the secure computable function g(x) means a function that allows a share [[g(x)]] of a function value g(x) to be calculated from the share [[x]] of the input value x. A specific procedure which is performed when g(x)=ax+b is shown in FIG. 2. In this case, a and b can be set at arbitrary values. Moreover, $t_0$ and $t_1$ can also be set at arbitrary values. Here, a, b, $t_0$, and $t_1$ are values (public values) that do not need to be concealed. It is clear from FIG. 2 that [[σ'(x)]] is calculated in accordance with the formula (3)' in Steps 1 to 5.

Since the linear function g(x)=ax+b can be calculated by performing one multiplication and one addition, calculation cost is very low. By contrast, for example, when the sigmoid function is approximated using a cubic function as the function g(x), as is clear from the fact that a cubic function is generally expressed as $ax^3+bx^2+cx+d$, calculation cost is obviously higher than the calculation cost required when the sigmoid function is approximated using a linear function. Moreover, it is also clear that complicated calculation of the sigmoid function can be composed only of simple computations, such as two magnitude comparisons, one NOT, three multiplications, and two additions (or two magnitude comparisons, one NOT, one AND, two multiplications, and two additions), which are processing necessary to calculate the approximate sigmoid function σ'(x), as a whole.

It is to be noted that, in the following description, the secret sigmoid function calculation algorithm is expressed as Sigmoid. Therefore, Sigmoid([[x]])=[[σ'(x)]] holds.

(Logistic Regression Analysis)

A model f($\vec{x}$) (where $\vec{x}=(x_1, \ldots, x_n)$) of a logistic regression analysis is expressed by the following formula using an n+1-dimensional vector $\vec{w}=(w_0, \ldots, w_n)$ as a model parameter.

$$f(\vec{x}) = \sigma(-\vec{w} \cdot (1, \vec{x})) = \sigma\left(-\left(w_0 + w_1 x_1 + \ldots + w_n x_n\right)\right) \quad (4)$$

Here, (1, $\vec{x}$) represents an n+1-dimensional vector (1, $x_1, \ldots, x_n$).

As a method for learning the model parameter $\vec{w}$, there is the steepest descent method which is a learning method for searching for a minimum value of a function. In the steepest descent method, learning is performed using the following input and parameters.

(Input) Data $\vec{x_i}$ on an explanatory variable and data $y_i$ on a response variable (0≤i≤m−1, where in is an integer greater than or equal to 1 and represents the number of pieces of learning data)

(Parameters) A learning rate η (0<η<1) and the number of learning processes T

It is assumed that appropriate values are set as the learning rate η and the number of learning processes T.

$\vec{w_t}=(w_{0,t}, \ldots, w_{n,t})$ is learned by the following formula as the model parameter obtained as a result of t (0≤t≤T−1) updates.

$$w_{j,t+1} = w_{j,t} - \eta \frac{1}{m} \sum_{i=0}^{m-1} \left(\sigma\left(w_{0,t} + w_{1,t}x_{i,1} + \ldots + w_{n,t}x_{i,n}\right) - y_i\right)x_{i,j} \quad (5)$$

That is, an update is performed for each j-th element $w_j$ of the model parameter $\vec{w}$ using the learning data $\vec{x_i}$ and $y_i$. It is assumed that an appropriate value is set as an initial value $\vec{w_0}$ of the model parameter $\vec{w}$.

Algorithm

The following description deals with an algorithm (a secret logistic regression calculation algorithm) that performs secure computation of a model parameter of a logistic regression model. The secret logistic regression calculation algorithm uses a share [[$\vec{x_i}$]] of the data $\vec{x_i}$ on the explanatory variable and a share [[$y_i$]] of the data $y_i$ on the response variable as input, calculates a share [[$\vec{w}$]] of the model parameter $\vec{w}$ using the parameters η and T which are public values, and outputs the share [[$\vec{w}$]]. A specific procedure is shown in FIG. 3. It is clear from FIG. 3 that [[$\vec{w}$]] is calculated in accordance with the formula (5) in Steps 4 to 19. Moreover, it is also clear that the value of the sigmoid function is determined in Step 8 using the secret sigmoid function calculation algorithm Sigmoid.

Using the secret sigmoid function calculation algorithm Sigmoid enhances the precision of calculation of the sigmoid function, which also enhances the precision of calculation of logistic regression. Moreover, as is clear from each step of the secret logistic regression calculation algorithm, a secret is kept in the course of calculation, which makes it possible to perform calculations securely without leaking information at all to the outside.

It is to be noted that, when calculation of the secret logistic regression calculation algorithm is performed using a fixed point (not a floating point) from the viewpoint of processing cost, numerical precision sometimes increases every time a multiplication is performed and exceeds the upper limit of a data type. Since processing including multiplication is repeatedly performed in this algorithm, it is necessary to perform truncate (intentionally decrease numerical precision in the middle of processing) to prevent overflow.

Application Example

Figure 4:
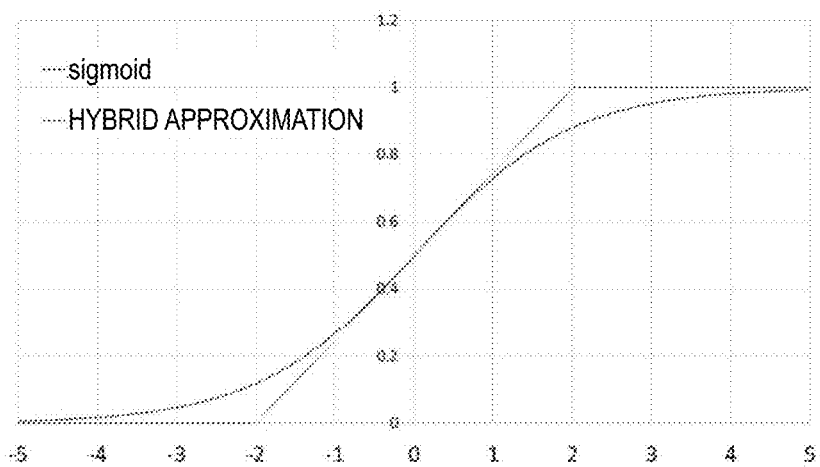
FIG. 4 is a graph showing an approximate sigmoid function $\sigma'(x)$.

The approximate sigmoid function σ'(x) which is obtained when a=0.25, b=0.5, $t_0$=−2, and $t_1$=2 is shown in FIG. 4. Hybrid approximation of FIG. 4 represents the approximate sigmoid function σ'(x). Since the gradient of the sigmoid function σ(x) is 0.25 and the value thereof is 0.5 when x=0, a=0.25 and b=0.5 are adopted. In FIG. 4, the sigmoid function (sigmoid in the drawing) is also shown, and it is clear from this drawing that the sigmoid function σ(x) is approximated by the approximate sigmoid function σ'(x) with a high degree of precision.

Moreover, in the logistic regression analysis, a value near x=0 is often used as a threshold at the time of final binary classification; therefore, it is preferable that the accuracy of approximation of the sigmoid function near x=0 is high. Using the approximate sigmoid function σ'(x) makes high the accuracy of approximation near x=0, which enhances the precision of a model parameter which is a final calculation result in the logistic regression analysis.

First Embodiment

Figure 5:
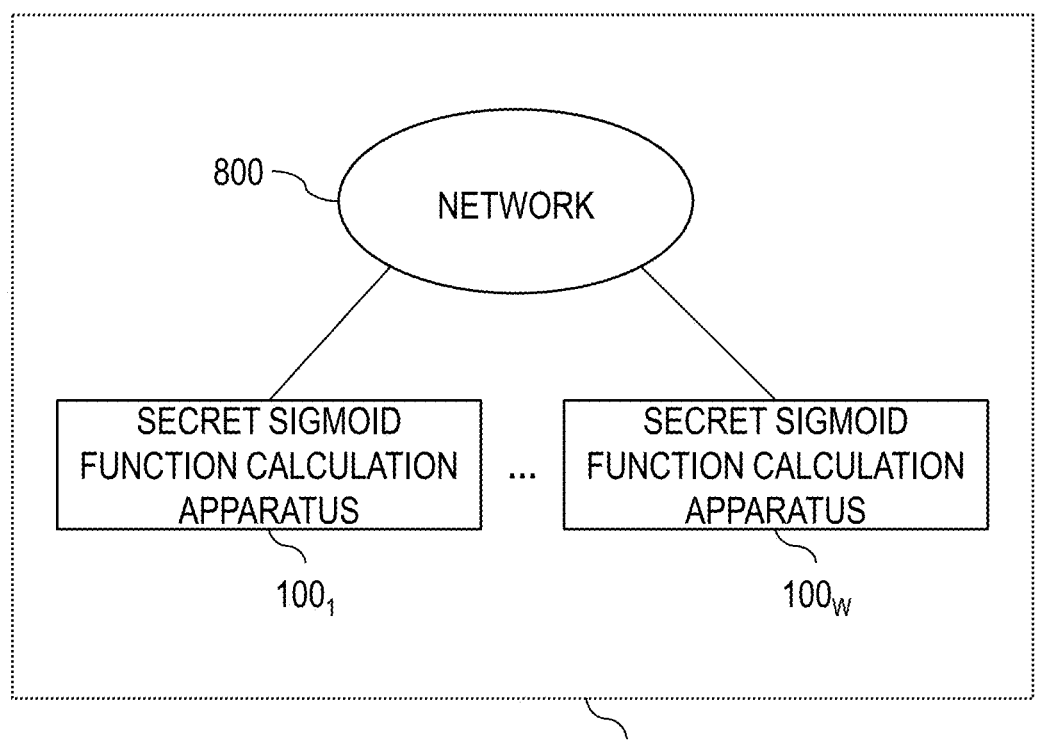
FIG. 5 is a block diagram showing the configuration of a secret sigmoid function calculation system 10.
Figure 6:
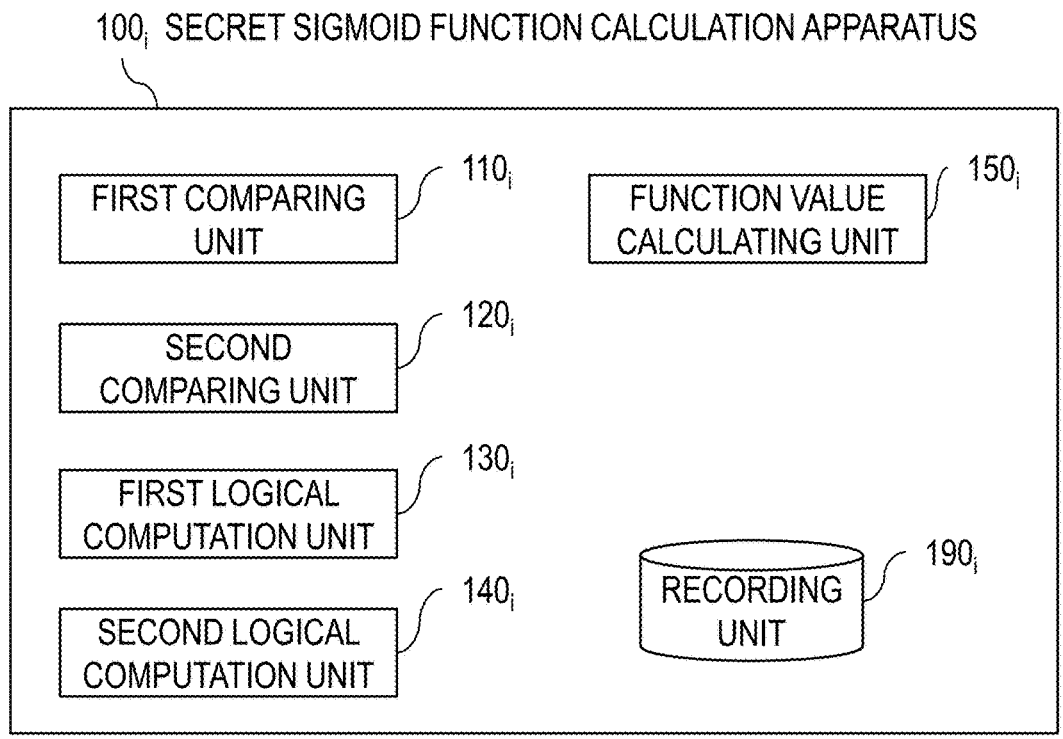
FIG. 6 is a block diagram showing the configuration of a secret sigmoid function calculation apparatus 100.
Figure 7:
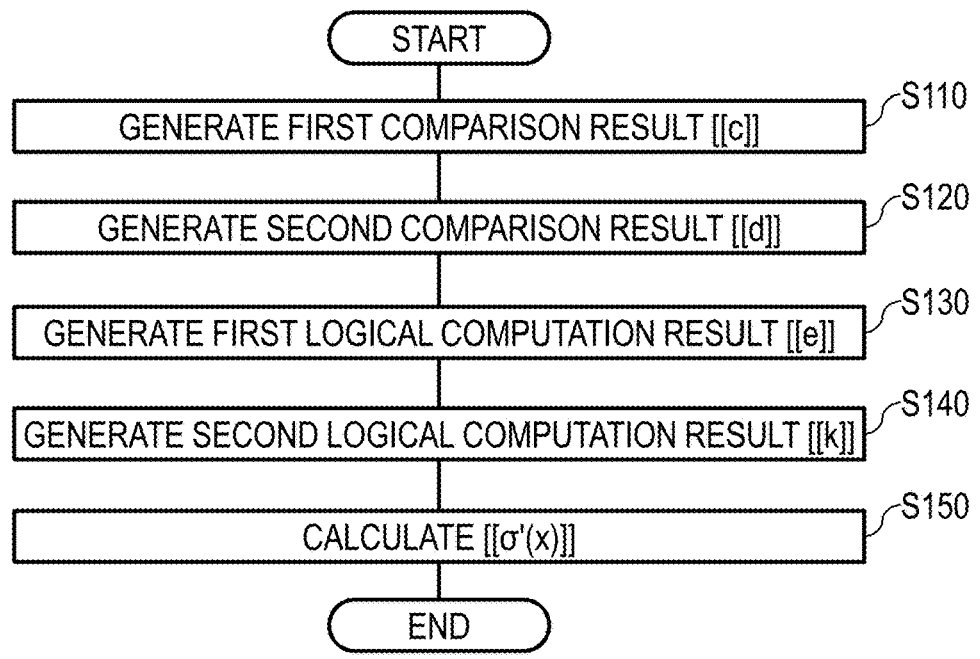
FIG. 7 is a flowchart showing an operation of the secret sigmoid function calculation system 10.

Hereinafter, a secret sigmoid function calculation system 10 will be described with reference to FIGS. 5 to 7. FIG. 5 is a block diagram showing the configuration of the secret sigmoid function calculation system 10. The secret sigmoid function calculation system 10 includes W (W is a predetermined integer greater than or equal to 3) secret sigmoid function calculation apparatuses $100_1, \ldots, 100_W$. The secret sigmoid function calculation apparatuses $100_1, \ldots, 100_W$ are connected to a network 800 and can communicate with one another. The network 800 may be, for example, a communications network such as the Internet or a broadcast communication channel. FIG. 6 is a block diagram showing the configuration of a secret sigmoid function calculation apparatus $100_i$ ($1 \le i \le W$). FIG. 7 is a flowchart showing an operation of the secret sigmoid function calculation system 10.

As shown in FIG. 6, the secret sigmoid function calculation apparatus $100_i$ includes a first comparing unit $110_i$, a second comparing unit $120_i$, a first logical computation unit $130_i$, a second logical computation unit $140_i$, a function value calculating unit $150_i$, and a recording unit $190_i$. Each of the constituent units of the secret sigmoid function calculation apparatus $100_i$ except the recording unit 190, is configured so as to be capable of executing, of computations which are required in the secret sigmoid function calculation algorithm, that is, at least concealment, addition, multiplication, magnitude comparison, a NOT, an AND, and hpsum, computations which are required to implement the function of each constituent unit. In the present invention, as specific functional configurations for implementing individual computations, configurations that can execute the algorithms which are disclosed in, for example, Reference Non-patent Literatures 1 to 4 serve the purpose, and their detailed explanations will be omitted because they are the existing configurations. Moreover, the recording unit $190_i$ is a constituent unit that records information which is necessary for processing which is performed by the secret sigmoid function calculation apparatus $100_i$. For example, the recording unit $190_i$ records the parameters $t_0$ and $t_1$ (where $t_0$ and $t_1$ are real numbers that satisfy $t_0<t_1$). Furthermore, the recording unit $190_i$ also records a parameter necessary for calculating the function g(x) that is used to define the approximate sigmoid function σ'(x). Here, an arbitrary secure computable function can be used as the function g(x). For example, g(x)=ax+b (where a and b are real numbers) can be adopted. In this case, the recording unit $190_i$ also records the parameters a and b.

By cooperative computations which are performed by the W secret sigmoid function calculation apparatuses $100_i$, the secret sigmoid function calculation system 10 implements the secret sigmoid function calculation algorithm which is a multi-party protocol. Thus, a first comparing means 110 (which is not shown in the drawing) of the secret sigmoid function calculation system 10 is configured with the first comparing units $110_1, \ldots, 110_W$, a second comparing means 120 (which is not shown in the drawing) is configured with the second comparing units $120_1, \ldots, 120_W$, a first logical computation means 130 (which is not shown in the drawing) is configured with the first logical computation units $130_1, \ldots, 130_W$, a second logical computation means 140 (which is not shown in the drawing) is configured with the second logical computation units $140_1, \ldots, 140_W$, and a function value calculating means 150 (which is not shown in the drawing) is configured with the function value calculating units $150_1, \ldots, 150_W$.

The secret sigmoid function calculation system 10 calculates, from the share [[x]] of the input value x, the share [[σ'(x)]] of the value of the sigmoid function for the input value x (see FIG. 2). Hereinafter, an operation of the secret sigmoid function calculation system 10 will be described in accordance with FIG. 7.

The first comparing means 110 generates a first comparison result [[c]] by [[c]]=less_than([[x]], $t_1$) from the share [[x]] of the input value x (S110). This corresponds to Step 1 of the secret sigmoid function calculation algorithm of FIG. 2.

The second comparing means 120 generates a second comparison result [[d]] by [[d]]=greater_than([[x]], $t_0$) from the share [[x]] of the input value x (S120). This corresponds to Step 2 of the secret sigmoid function calculation algorithm of FIG. 2.

The first logical computation means 130 generates a first logical computation result [[e]] by [[e]]=not([[c]]) from the first comparison result [[c]] generated in S110 (S130). This corresponds to Step 3 of the secret sigmoid function calculation algorithm of FIG. 2.

The second logical computation means 140 generates a second logical computation result [[k]] by [[k]]=and([[c]], [[d]]) from the first comparison result [[c]] generated in S110 and the second comparison result [[d]] generated in S120 (S140). This corresponds to Step 4 of the secret sigmoid function calculation algorithm of FIG. 2. It goes without saying that [[k]]=mul([[c]], [[d]]) may be used in place of [[k]]=and([[c]], [[d]]).

The function value calculating means 150 calculates the share [[σ'(x)]] of the function value by [[σ'(x)]]=mul([[k]], [[g(x)]])+[[e]] from the share [[x]] of the input value x, the first logical computation result [[e]] generated in S130, and the second logical computation result [[k]] generated in S140 (S150). This corresponds to Step 5 of the secret sigmoid function calculation algorithm of FIG. 2.

According to the embodiment of the present invention, it is possible to perform secure computation of the sigmoid function with high speed and precision.

In the embodiment of the present invention, calculation of the sigmoid function, which is a nonlinear function whose secure computation is not easy, is reduced to a combination of simple computations such as concealment, addition, and multiplication. This makes it possible to perform high-speed and high-precision secure computation of the sigmoid function. Moreover, since the value in the middle of calculation is concealed, it is possible to perform secure computation of the sigmoid function securely.

Second Embodiment

Figure 8:
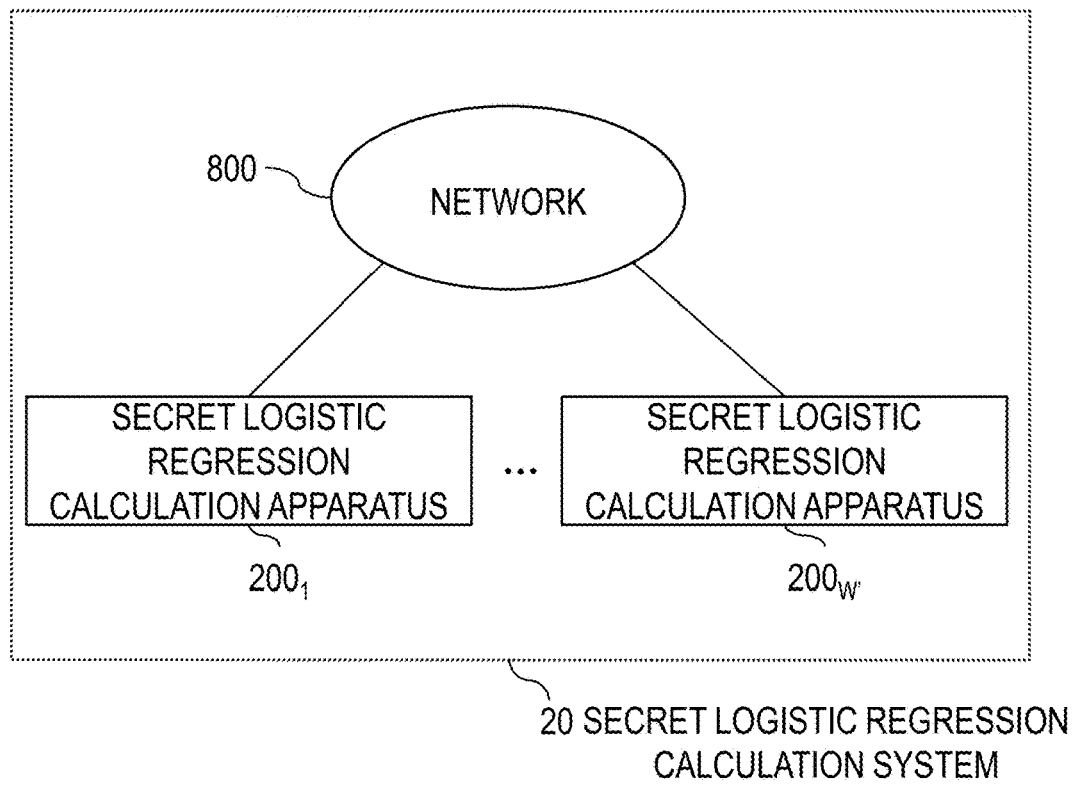
FIG. 8 is a block diagram showing the configuration of a secret logistic regression calculation system 20.
Figure 9:
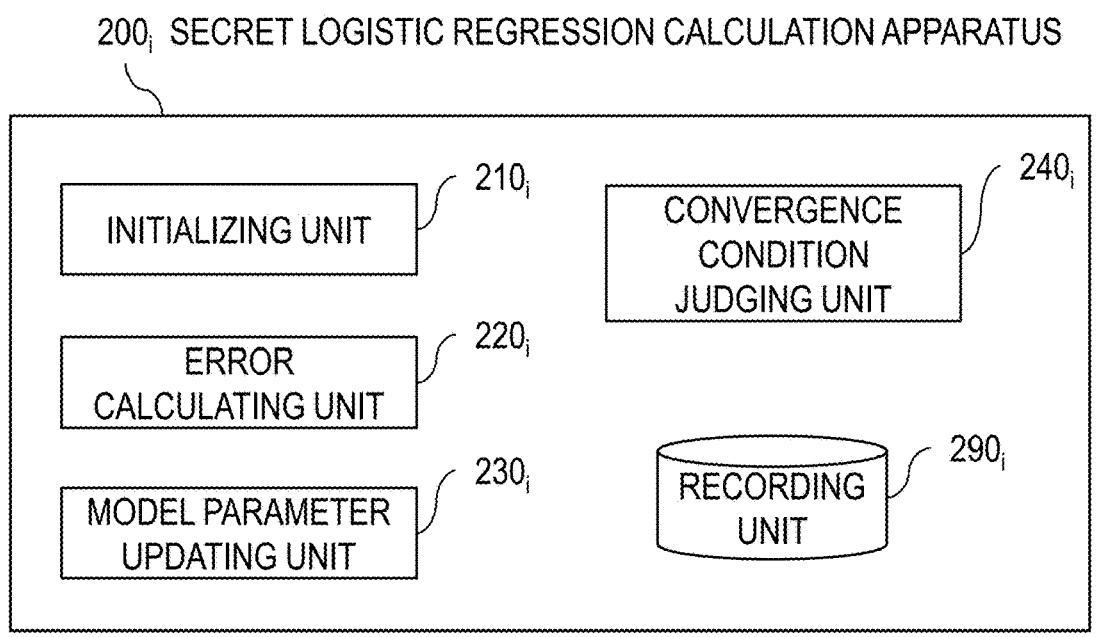
FIG. 9 is a block diagram showing the configuration of a secret logistic regression calculation apparatus 200.
Figure 10:
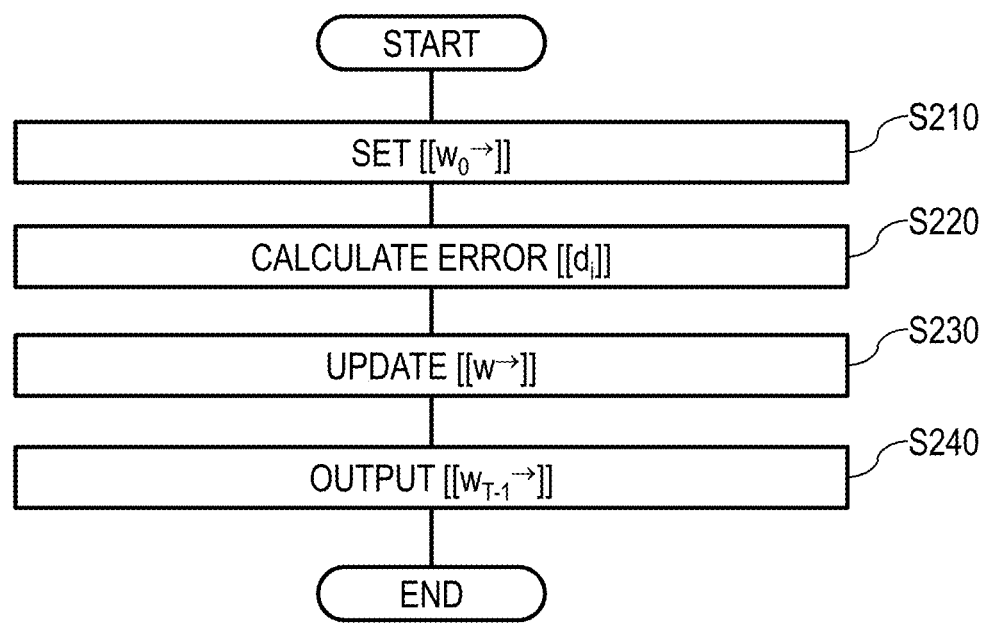
FIG. 10 is a flowchart showing an operation of the secret logistic regression calculation system 20.

Hereinafter, a secret logistic regression calculation system 20 will be described with reference to FIGS. 8 to 10. FIG. 8 is a block diagram showing the configuration of the secret logistic regression calculation system 20. The secret logistic regression calculation system 20 includes W' (W' is a predetermined integer greater than or equal to 3) secret logistic regression calculation apparatuses $200_1, \ldots, 200_{W'}$. The secret logistic regression calculation apparatuses $200_1, \ldots, 200_{W'}$ are connected to a network 800 and can communicate with one another. The network 800 may be, for example, a communications network such as the Internet or a broadcast communication channel. FIG. 9 is a block diagram showing the configuration of a secret logistic regression calculation apparatus $200_i$ ($1 \le i \le W'$). FIG. 10 is a flowchart showing an operation of the secret logistic regression calculation system 20.

As shown in FIG. 9, the secret logistic regression calculation apparatus $200_i$ includes an initializing unit $210_i$, an error calculating unit $220_i$, a model parameter updating unit $230_i$, a convergence condition judging unit $240_i$, and a recording unit $290_i$. Each of the constituent units of the secret logistic regression calculation apparatus $200_i$ except the recording unit $290_i$ is configured so as to be capable of executing, of computations which are required in the secret logistic regression calculation algorithm, that is, at least concealment, addition, multiplication, magnitude comparison, a NOT, an AND, and hpsum, computations which are required to implement the function of each constituent unit. In the present invention, as specific functional configurations for implementing individual computations, configurations that can execute the algorithms which are disclosed in, for example, Reference Non-patent Literatures 1 to 4 serve the purpose, and their detailed explanations will be omitted because they are the existing configurations. Moreover, the recording unit $290_i$ is a constituent unit that records information which is necessary for processing which is performed by the secret logistic regression calculation apparatus $200_i$. For example, the recording unit $290_i$ records the parameters η and T (where η is a real number that satisfies 0<η<1 and T is an integer greater than or equal to 1). Furthermore, the recording unit $290_i$ also records a parameter necessary for calculating the secret sigmoid function calculation algorithm Sigmoid. For example, the recording unit $290_i$ records the parameters $t_0$ and $t_1$.

By cooperative computations which are performed by the W' secret logistic regression calculation apparatuses $200_i$, the secret logistic regression calculation system 20 implements the secret logistic regression calculation algorithm which is a multi-party protocol. Thus, an initializing means 210 (which is not shown in the drawing) of the secret logistic regression calculation system 20 is configured with the initializing units $210_1, \ldots, 210_{W'}$, an error calculating means 220 (which is not shown in the drawing) is configured with the error calculating units $220_1, \ldots, 220_{W'}$, a model parameter updating means 230 (which is not shown in the drawing) is configured with the model parameter updating units $230_1, \ldots, 230_{W'}$, and a convergence condition judging means 240 (which is not shown in the drawing) is configured with the convergence condition judging units $240_1, \ldots, 240_{W'}$.

The secret logistic regression calculation system 20 calculates the share $[[\vec{w}]]$ of the model parameter $\vec{w}$ of the logistic regression model from the share $[[\vec{x}_i]]$ ($0 \le i \le m-1$, where m is an integer greater than or equal to 1) of the data $\vec{x}_i$ on the explanatory variable and the share $[[y_i]]$ ($0 \le i \le m-1$) of the data $y_i$ on the response variable (see FIG. 3). Hereinafter, an operation of the secret logistic regression calculation system 20 will be described in accordance with FIG. 10.

The initializing means 210 sets a share $[[\vec{w}_0]]$ of the initial value $\vec{w}_0$ of the model parameter $\vec{w}$ (S210). Specifically, the initializing means 210 only has to set the share $[[\vec{w}_0]]$ of the appropriate initial value $\vec{w}_0$ recorded on the recording unit $290_i$ in advance. This corresponds to Step 1 of the secret logistic regression calculation algorithm of FIG. 3.

For i=0, . . . , m−1, the error calculating means 220 calculates $[[b_i]]$ by $[[b_i]]=\text{hpsum}([[\vec{w}_t]], [[(1, \vec{x}_i)]])$ from a share $[[\vec{w}_t]]$ of a value $\vec{w}_t$ of the model parameter $\vec{w}$ obtained as a result of t updates and the share $[[\vec{x}_i]]$, calculates $[[c_i]]$ by $[[c_i]]=\text{Sigmoid}([[b_i]])$ from $[[b_i]]$, and calculates an error $[[d_i]]$ by $[[d_i]]=[[c_i]]-[[y_i]]$ from the shares $[[y_i]]$ and $[[c_i]]$ (S220). This corresponds to Steps 5 to 11 of the secret logistic regression calculation algorithm of FIG. 3. It is to be noted that Sigmoid only has to be calculated using the secret sigmoid function calculation system 10.

For j=0, . . . , n, the model parameter updating means 230 calculates $[[e]]$ by $[[e]]=\Sigma_{i=0}^{m-1}[[d_i]][[x_{i,j}]]$ from the error $[[d_i]]$ ($0 \le i \le m-1$) calculated in S220 and a j-th element $[[x_{i,j}]]$ ($0 \le i \le m-1$) of the share $[[\vec{x}_i]]$ and calculates, from a j-th element $[[w_{j, t}]]$ of the share $[[\vec{w}_t]]$ and $[[e]]$, a j-th element $[[w_{j, t+1}]]$ of a share $[[\vec{w}_{t+1}]]$ of a value $\vec{w}_{t+1}$ of the model parameter $\vec{w}$ obtained as a result of t+1 updates by $[[w_{j, t+1}]]=[[w_{j, t}]]-\eta(1/m)[[e]]$ (S230). It is assumed that $x_{i,0}=1$ (i=0, . . . , m−1). This corresponds to Steps 12 to 17 of the secret logistic regression calculation algorithm of FIG. 3.

The convergence condition judging means 240 judges whether or not a repetition condition, that is, t<T, for model parameter update, which is set in advance, is satisfied. If the condition is satisfied, the processing from S220 to S230 is repeated; if the repetition condition is not satisfied (when the number of learning processes reaches a predetermined number of learning processes T), a share $[[\vec{w}_{T-1}]]$ is output as the share $[[\vec{w}]]$ of the model parameter $\vec{w}$ and the processing is ended (S240).

According to the embodiment of the present invention, it is possible to perform secure computation of a model parameter of a logistic regression model with high speed and precision.

APPENDIX

Each apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the apparatus executing the processing or any necessity.

As already mentioned, when the processing functions of the hardware entities described in the embodiments (the apparatuses of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A secret sigmoid function calculation system in which $t_0$ and $t_i$ are assumed to be real numbers that satisfy $t_0 < t_i$ and $g(x)$ is assumed to be a secure computable function, and the secret sigmoid function calculation system is configured with three or more secret sigmoid function calculation apparatuses and calculates, from a share [[x]] of an input value x, a share [[σ'(x)]] of a value of a sigmoid function for the input value x, wherein the share of the input value x is concealed by secret sharing among the three or more secret sigmoid function calculation apparatuses, the secret sigmoid function calculation system comprising: a first comparing circuitry configured to generate a first comparison result [[c]] by [[c]]=less than([[x]], $t_i$) from the share [[x]]; a second comparing circuitry configured to generate a second comparison result [[d]] by [[d]]=greater than([[x]], to) from the share [[x]]; a first logical comparing circuitry configured to generate a first logical computation result [[e]] by [[e]] =not([[c]]) from the first comparison result [[c]]; a second comparing circuitry configured to generate a second logical computation result [[k]] by [[k]]=and([[c]], [[d]]) or [[k]] =mul([[c]], [[d]]) from the first comparison result [[c]] and the second comparison result [[d]]; and a function value comparing circuitry configured to calculate the share [[σ' (x)]] by [[σ'(x)]]=mul([[k]], [[g(x)]])+[[e]] from the share [[x]], the first logical computation result [[e]], and the second logical computation result [[k]], wherein the function g(x) is g(x)=ax+b (where a and b are real numbers), and the values of a, b, $t_o$, and $t_i$ are determined by the range of x for which the value of the sigmoid function is to be calculated, and the values of $t_0$ and $t_i$ are determined such that $-5 < t_0$ and $t_i < 5$ where the value of the sigmoid function is approximately 0 when x is less than or equal to $-5$ and is approximately 1 when x is greater than or equal to 5.

2. A secret logistic regression calculation system in which
m is assumed to be an integer greater than or equal to 1, $\eta$ is assumed to be a real number that satisfies $0 < \eta < 1$, and Sigmoid([[x]]) is assumed to be a function that calculates, from a share [[x]] of an input value x, a share of a value of a sigmoid function for the input value x using the secret sigmoid function calculation system according to claim 1, and the secret logistic regression calculation system is configured with three or more secret logistic regression calculation apparatuses and calculates a share [[$\vec{w}$]] of a model parameter $\vec{w}$ of a logistic regression model from a share [[$\vec{x_i}$]] ($0 \le i \le m-1$) of data $\vec{x_i}$ on an explanatory variable and a share [[$y_i$]]($0 \le i \le m-1$) of data $y_i$ on a response variable, the secret logistic regression calculation system comprising:

error calculating circuitry configured to calculate, for $i=0, \ldots, m-1$, [[$b_i$]] by [[$b_i$]]=hpsum([[$\vec{w_t}$]], [[$(1, \vec{x_i})$]]) from a share [[$\vec{w_t}$]] of a value $\vec{w_t}$ of the model parameter $\vec{w}$ obtained as a result of t updates and the share [[$\vec{x_i}$]], calculates [[$c_i$]] by [[$c_i$]]=Sigmoid([[$b_i$]]) from the [[$b_i$]], and calculate an error [[$d_i$]] by [[$d_i$]]=[[$c_i$]]−[[$y_i$]] from the share [[$y_i$]] and the [[$c_i$]]; and model parameter updating circuitry configured to calculate, for $j=0, \ldots, n$, [[e]] by [[e]]=$\Sigma_{i=0}^{m-1}$[[$d_i$]][[$x_{i,j}$]] from the error [[$d_i$]]($0 \le i \le m-1$) and a j-th element [[$x_{i,j}$]]($0 \le i \le m-1$) of the share [[$\vec{x_i}$]] and calculate, from a j-th element [[$w_{j,t}$]], of the share [[$\vec{w_t}$]] and the [[e]], a j-th element [[$w_{j,t+1}$]] of a share [[$\vec{w_{t+1}}$]] of a value $\vec{w_{t+1}}$ of the model parameter $\vec{w}$ obtained as a result of t+1 updates by [[$w_{j,t+1}$]]=[[$w_{j,t}$]]−$\eta(1/m)$[[e]].

3. A secret sigmoid function calculation apparatus in which $t_0$ and $t_i$ are assumed to be real numbers that satisfy $t_0 < t_i$ and g(x) is assumed to be a secure computable function, and the secret sigmoid function calculation apparatus is a secret sigmoid function calculation apparatus in a secret sigmoid function calculation system that is configured with three or more secret sigmoid function calculation apparatuses and calculates, from a share [[x]] of an input value x, a share [[σ'(x)]] of a value of a sigmoid function for the input value x, wherein the share of the input value x is concealed by secret sharing among the three or more secret sigmoid function calculation apparatuses, the secret sigmoid function calculation apparatus comprising: a first comparing circuitry configured to generate a first comparison result [[c]] by [[c]]=less than([[x]], $t_i$) from the share [[x]]; a second comparing circuitry configured to generate a second comparison result [[d]] by [[d]]=greater than([[x]], $t_o$) from the share [[x]]; a first logical comparing circuitry configured to generate a first logical computation result [[e]] by [[e]]=not([[c]]) from the first comparison result [[c]]; a second logical comparing circuitry configured to generate second logical computation result [[k]] by [[k]]=and([[c]], [[d]]) or [[k]]=mul([[c]], [[d]]) from the first comparison result [[c]] and the second comparison result [[d]]; and a function value calculating circuitry configured to calculate the share [[σ'(x)]] by [[σ'(x)]]=mul([[k]], [[g(x)]])+[[e]] from the share [[x]], the first logical computation result [[e]], and the second logical computation result [[k]], wherein the function g(x) is g(x)=ax+b (where a and b are real numbers), and the values of a, b, $t_o$, and $t_i$ are determined by the range of x for which the value of the sigmoid function is to be calculated, and the values of $t_o$ and $t_0$ are determined such that $-5 < t_o$ and $t_i < 5$ where the value of the sigmoid function is approximately 0 when x is less than or equal to $-5$ and is approximately 1 when x is greater than or equal to 5.

4. A secret logistic regression calculation apparatus in which
m is assumed to be an integer greater than or equal to 1, $\eta$ is assumed to be a real number that satisfies $0 < \eta < 1$, and Sigmoid([[x]]) is assumed to be a function that calculates, from a share [[x]] of an input value x, a share of a value of a sigmoid function for the input value x using the secret sigmoid function calculation system configured with three or more secret sigmoid function calculation apparatuses, each being the secret sigmoid function calculation apparatus according to claim 3, and the secret logistic regression calculation apparatus is a secret logistic regression calculation apparatus in a secret logistic regression calculation system that is configured with three or more secret logistic regression calculation apparatuses and calculates a share [[$\vec{w}$]] of a model parameter $\vec{w}$ of a logistic regression model from a share [[$\vec{x_i}$]]($0 \le i \le m-1$) of data $\vec{x_i}$ on an explanatory variable and a share [[$y_i$]] ($0 \le i \le m-1$) of data $y_i$ on a response variable, the secret logistic regression calculation apparatus comprising:

error calculating circuitry configured to calculate, for $i=0, \ldots, m-1$, [[$b_i$]] by [[$b_i$]]=hpsum([[$\vec{w_t}$]], [[$(1, \vec{x_i})$]]) from a share [[$\vec{w_t}$]] of a value $\vec{w_t}$ of the model parameter $\vec{w}$ obtained as a result of t updates and the share [[$\vec{x_i}$]], calculates [[$c_i$]] by [[$c_i$]]=Sigmoid([[$b_i$]]) from the [[$b_i$]], and calculate an error [[$d_i$]] by [[$d_i$]]=[[$c_i$]]−[[$y_i$]] from the share [[$y_i$]] and the [[$c_i$]]; and model parameter updating circuitry configured to calculate, for $j=0, \ldots, n$, [[e]] by [[E]]=$\Sigma_{i=0}^{m-1}$[[$d_i$]][[$x_{i,j}$]] from the error [[$d_i$]]($0 \le i \le m-1$) and a j-th element [[$x_{i,j}$]] ($0 \le i \le m-1$) of the share [[$\vec{x_i}$]] and calculate, from a j-th element [[$w_{j,t}$]], of the share [[$\vec{w_t}$]] and the [[e]], a j-th element [[$w_{j,t+1}$]], of a share [[$\vec{w_{t+1}}$]] of a value $\vec{w_{t+1}}$ of the model parameter $\vec{w}$ obtained as a result of t+1 updates by [[$w_{j,t+1}$]]=[[$w_{j,t}$]]−$\eta(1/m)$[[e]].

5. A secret sigmoid function calculation method in which $t_0$ and $t_i$ are assumed to be real numbers that satisfy $t_0 < t_i$ and g(x) is assumed to be a secure computable function, and the secret sigmoid function calculation method is a secret sigmoid function calculation method by which a secret sigmoid function calculation with three or more secret sigmoid function calculation apparatuses with circuitry that calculates, from a share [[x]] of an input value x, a share [[σ'(x)]] of a value of a sigmoid function for the input value x, wherein the share of the input value x is concealed by secret sharing among the three or more secret sigmoid function calculation apparatuses, the secret sigmoid function calculation method comprising: a first comparing step in which the secret sigmoid function calculation system generates a first comparison result [[c]] by [[c]], $t_i$) from the share [[x]]; a second comparing step in which the secret sigmoid function calculation system generates a second comparison result [[d]] by [[d]]=greater than([[x]], to) from the share [[x]]; a first logical computation step in which the secret sigmoid function calculation system generates a first logical computation result [[e]] by |[[e]]=not([[c]]) from the first comparison result [[c]]; a second logical computation step in which the secret sigmoid function calculation system generates a second logical computation result [[k]] by [[k]]=and([[c]]≠ [[d]]) or [[k]]=mul([[c]], [[d]]) from the first comparison result |ci | and the second comparison result $[[d]]$; and a function value calculating step in which the secret sigmoid function calculation system calculates the share $[[\sigma'(x)]]$ by $[[\sigma'(x)]]=\mathrm{mul}([[k]],[[g(x)]])+[[e]]$ from the share $[[x]]$, the first logical computation result $[[e]]$, and the second logical computation result $[[k]]$, wherein the function $g(x)$ is $g(x)=ax+b$ (where a and b are real numbers), and the values of a, b, $t_o$, and $t_i$ are determined by the range of x for which the value of the sigmoid function is to be calculated, and the values of $t_o$ and $t_i$ are determined such that $-5 < t_o$ and $t_i < 5$ where the value of the sigmoid function is approximately 0 when x is less than or equal to $-5$ and is approximately 1 when x is greater than or equal to 5.

6. A secret logistic regression calculation method in which
m is assumed to be an integer greater than or equal to 1, η is assumed to be a real number that satisfies 0<η<1, and Sigmoid($[[x]]$) is assumed to be a function that calculates, from a share $[[x]]$ of an input value x, a share of a value of a sigmoid function for the input value x using the secret sigmoid function calculation method according to claim 5, and the secret logistic regression calculation method is a secret logistic regression calculation method by which a secret logistic regression calculation system configured with three or more secret logistic regression calculation apparatuses with circuitry that calculates a share $[[\vec{w}]]$ of a model parameter $\vec{w}$ of a logistic regression model from a share $[[\vec{x_i}]]$ (0≤i≤m−1) of data $\vec{x_i}$ on an explanatory variable and a share $[[y_i]]$ (0≤i≤m−1) of data $y_i$ on a response variable, the secret logistic regression calculation system comprising:

an error calculating step in which, for i=0, ..., m−1, the secret logisitic regression calculation system calculates $[[b_i]]$ by $[[b_i]]=\mathrm{hpsum}([[\vec{w_t}]], [[(1, \vec{x_i})]])$ from a share $[[\vec{w_t}]]$ of a value $\vec{w_t}$ of the model parameter $\vec{w}$ obtained as a result of t updates and the share $[[x_i]]$, calculates $[[c_i]]$ by $[[c_i]]=\mathrm{Sigmoid}([[b_i]])$ from the $[[b_i]]$, and calculates an error $[[d_i]]$ by $[[d_i]]=[[c_i]]-[[y_i]]$ from the share $[[y_i]]$ and the $[[c_i]]$; and model parameter updating step in which, for j=0, ..., η, the secret logistic regression calculation system calculates $[[e]]$ by $[[e]]=\Sigma_{i=0}^{m-1}[[d_i]][[x_{i,j}]]$ from the error $[[d_i]]$ (0≤i≤m−1) and a j-th element $[[x_{i,j}]]$ (0≤i≤m−1) of the share $[[\vec{x_i}]]$ of a value $\vec{w_{t+1}}$ of the model parameter $\vec{w}$ obtained as a result of t+1 updates by $[[w_{j,t+1}]]=[[w_{j,t}]]-\eta(1/m)[[e]]$.

7. A non-transitory computer-readable storage medium which stores a program for making a computer function as the secret sigmoid function calculation apparatus according to claim 3.

8. A non-transitory computer-readable storage medium which stores a program for making a computer function as the secret logistic regression calculation apparatus according to claim 4.

9. A secret sigmoid function calculation system in which $t_o$ and $t_i$ are assumed to be real numbers that satisfy $t_0 < t_i$ and $g(x)$ is assumed to be a secure computable function, and the secret sigmoid function calculation system is configured with three or more secret sigmoid function calculation apparatuses and calculates, from a share $[[x]]$ of an input value x, a share $[[\sigma'(x)]]$ of a value of a sigmoid function for the input value x, wherein the share of the input value x is concealed by secret sharing among the three or more secret sigmoid function calculation apparatuses, the secret sigmoid function calculation system comprising: a first comparing circuitry configured to generate a first comparison result by $[[c]][[c]]=\mathrm{less\ than}([[x]], t_i)$ from the share $[[x]]$; a second comparing circuitry configured to generate a second comparison result $[[d]]$ by $[[d]]=\mathrm{greater\ than}([[x]], t_o)$ from the share $[[x]]$; a first logical comparing circuitry configured to generate a first logical computation result $[[e]]$ by $[[e]]=\mathrm{not}([[c]])$ from the first comparison result $[[c]]$; a second comparing circuitry configured to generate a second logical computation result $[[k]]$ by $[[k]]=\mathrm{and}([[c]], [[d]])$ or $[[k]]=\mathrm{mul}([[c]], [[d]])$ from the first comparison result $[[c]]$ and the second comparison result $[[d]]$; and a function value comparing circuitry configured to calculate the share $[[\sigma'(x)]]$ by $[[\sigma']]=\mathrm{mul}([[k]], [[g(x)]])+[[e]]$ from the share $[[x]]$, the first logical computation result $[[e]]$, and the second logical computation result $[[k]]$, wherein the function $g(x)$ is $g(x)=ax+b$, the values of a and b are determined such that a=0.25 and b=0.5 where the gradient of the sigmoid function is 0.25 and the value thereof is 0.5 when x=0, and the values of $t^o$ and $t^i$ are determined such that $t^o=-2$ and $t^i=2$ where the value of the sigmoid function is approximately 0 when x is less than or equal to −5 and is approximately 1 when x is greater than or equal to 5.

10. A secret logistic regression calculation system in which
m is assumed to be an integer greater than or equal to 1, n is assumed to be a real number that satisfies 0<η<1, and Sigmoid($[[x]]$) is assumed to be a function that calculates, from a share $[[x]]$ of an input value x, a share of a value of a sigmoid function for the input value x using the secret sigmoid function calculation system according to claim 9, and the secret logistic regression calculation system is configured with three or more secret logistic regression calculation apparatuses and calculates a share $[[\vec{w}]]$ of a model parameter $\vec{w}$ of a logistic regression model from a share $[[\vec{x_i}]]$(0≤i≤m−1) of data $\vec{x_i}$ on an explanatory variable and a share $[[y_i]]$(0≤i≤m−1) of data $y_i$ on a response variable, the secret logistic regression calculation system comprising:

error calculating circuitry configured to calculate, for i=0, ..., m−1, $[[b_i]]$ by $[[b_i]]=\mathrm{hpsum}([[\vec{w_t}]], [[(1, \vec{x_i})]])$ from a share $[[\vec{w_t}]]$ of a value $\vec{w_t}$ of the model parameter $\vec{w}$ obtained as a result of t updates and the share $[[\vec{x_i}]]$, calculates $[[c_i]]$ by $[[c_i]]=\mathrm{Sigmoid}([[b_i]])$ from the $[[b_i]]$, and calculate an error $[[d_i]]$ by $[[d_i]]=[[c_i]]-[[y_i]]$ from the share $[[y_i]]$ and the $[[c_i]]$; and model parameter updating circuitry configured to calculate, for j=0, ..., η, $[[e]]$ by $[[e]]=\Sigma_{i=0}^{m-1}[[d_i]][[x_{i,j}]]$ from the error $[[d_i]]$ (0≤i≤m−1) and a j-th element $[[x_{i,j}]]$(0≤i≤m−1) of the share $[[\vec{x_i}]]$ and calculate, from a j-th element $[[w_{j,t}]]$ of the share $[[\vec{w_t}]]$ and the $[[e]]$, a j-th element $[[w_{j,t+1}]]$ of a share $[[\vec{w_{t+1}}]]$ of a value $\vec{w_{t+1}}$ of the model parameter $\vec{w}$ obtained as a result of t+1 updates by $[[w_{j,t+1}]]=[[w_{j,t}]]-\eta(1/m)[[e]]$.

11. A secret sigmoid function calculation apparatus in which $t_0$ and $t_i$ are assumed to be real numbers that satisfy $t_0 < t_i$ and $g(x)$ is assumed to be a secure computable function, and the secret sigmoid function calculation apparatus is a secret sigmoid function calculation apparatus in a secret sigmoid function calculation system that is configured with three or more secret sigmoid function calculation apparatuses and calculates, from a share $[[x]]$ of an input value x, a share $[[\sigma'(x)]]$ of a value of a sigmoid function for the input value x, wherein the share of the input value x is concealed by secret sharing among the three or more secret sigmoid function calculation apparatuses, the secret sigmoid function calculation apparatus comprising: a first comparing circuitry configured to generate a first comparison result [[c]] by [[c]]=less than([[x]], $t_i$) from the share [[x]]; a second comparing circuitry configured to generate a second comparison result [[d]] by [[d]]=greater than([[x]], to) from the share [[x]]; a first logical comparing circuitry configured to generate a first logical computation result [[e]] by [[e]]=not ([[c]]) from the first comparison result [[c]]; a second logical comparing circuitry configured to generate second logical computation result [[k]] by [[k]]=and([[c]], [[d]]) or [[k]]= mul([[c]], [[d]]) from the first comparison result [[c]] and the second comparison result [[d]]; and a function value calculating circuitry configured to calculate the share [[6'(x)]] by [[σ'(x)]]=mul([[k]], [[g(x)]])+[[e]] from the share [[x]], the first logical computation result [[e]], and the second logical computation result [[k]] Wherein the function g(x) is g(x)= ax+b (where a and b are real numbers), the values of a and b are determined such that a=0.25 and b=0.5 where the gradient of the sigmoid function is 0.25 and the value thereof is 0.5 when x=0, and the values of $t_o$ and $t_i$ are determined such that to =−2 and ti=2 where the value of the sigmoid function is approximately 0 when x is less than or equal to −5 and is approximately 1 when x is greater than or equal to 5.

12. A secret logistic regression calculation apparatus in which m is assumed to be an integer greater than or equal to 1, η is assumed to be a real number that satisfies 0<η<1, and Sigmoid([[x]]) is assumed to be a function that calculates, from a share [[x]] of an input value x, a share of a value of a sigmoid function for the input value x using a secret sigmoid function calculation system configured with three or more secret sigmoid function calculation apparatuses, each being the secret sigmoid function calculation apparatus according to claim 11, and the secret logistic regression calculation apparatus is a secret logistic regression calculation apparatus in a secret logistic regression calculation system that is configured with three or more secret logistic regression calculation apparatuses and calculates a share of a model parameter $\vec{w}$ of a logistic regression model from a share [[$\vec{x_i}$]](0≤i≤m−1) of data $\vec{x_i}$ on an explanatory variable and a share [[$y_i$]](0≤i≤m−1) of data $y_i$ on a response variable, the secret logistic regression calculation apparatus comprising:

error calculating circuitry configured to calculate, for i=0, . . . , m−1, [[$b_i$]] by [[$b_i$]]=hpsum([[$\vec{w_t}$]], [[(1, $\vec{x_i}$)]]) from a share [[$\vec{w_t}$]] of a value $\vec{w_t}$ of the model parameter $\vec{w}$ obtained as a result of t updates and the share [[$\vec{x_i}$]], calculate [[$c_i$]] by [[$c_i$]]=Sigmoid ([[$b_i$]]) from the [[$b_i$]], and calculate an error [[$d_i$]] by [[$d_i$]]=[[$c_i$]]−[[$y_i$]] from the share [[$y_i$]] and the [[$c_i$]]; and model parameter updating circuitry configured to calculate, for j=0, . . . , η, [[e]] by [[e]]=$\sum_{i=0}^{m-1}$[[$d_i$]][[$x_{i,j}$]] from the error [[$d_i$]](0≤i≤m−1) and a j-th element [[$x_{i,j}$]](0≤i≤m−1) of the share [[$\vec{x_i}$]] and calculate, from a j-th element [[$w_{j,t}$]] of the share [[$\vec{w_t}$]] and the, a j-th element [[$w_{j,t+1}$]] of a share [[$\vec{w_{t+1}}$]] of a value $\vec{w_{t+1}}$ of the model parameter $\vec{w}$ obtained as a result of t+1 updates by [[$w_{j,t+1}$]]=[[$w_{j,t}$]]−η(1/m)[[e]].

13. A secret sigmoid function calculation method in which $t_0$ and $t_i$ are assumed to be real numbers that satisfy $t_0<t_i$ and g(x) is assumed to be a secure computable function, and the secret sigmoid function calculation method is a secret sigmoid function calculation method by which a secret sigmoid function calculation with three or more secret sigmoid function calculation apparatuses with circuitry that calculates, from a share [[x]] of an input value x, a share [[σ'(x)]] of a value of a sigmoid function for the input value x, wherein the share of the input value x is concealed by secret sharing among the three or more secret sigmoid function calculation apparatuses, the secret sigmoid function calculation method comprising: a first comparing step in which the secret sigmoid function calculation system generates a first comparison result [[c]] by [[c]]=less than([[x]], $t_i$) from the share [[x]]; a second comparing step in which the secret sigmoid function calculation system generates a second comparison result [[d]] by [[d]]=greater than([[x]], to) from the share [[x]]; a first logical computation step in which the secret sigmoid function calculation system generates a first logical computation result [[e]] by l[[e]]=not([[c]]) from the first comparison result [[c]]; a second logical computation step in which the secret sigmoid function calculation system generates a second logical computation result [[k]] by [[k]]= and([[c]]≠[[d]]) or [[k]]=mul([[c]], [[d]]) from the first comparison result |ci | and the second comparison result [[d]]; and a function value calculating step in which the secret sigmoid function calculation system calculates the share [[a'(x)]] by [[6'(x)]]=mul([[k]]≠[[g(x)]])+[[e]] from the share [[x]], the first logical computation result [[e]], and the second logical computation result [[k]], wherein the function g(x) is g(x)=ax+b (where a and b are real numbers), the values of a and b are determined such that a=0.25 and b=0.5 where the gradient of the sigmoid function is 0.25 and the value thereof is 0.5 when x=0, and the values of $t_o$ and $t_i$ are determined such that $t_o$=−2 and $t_i$=2 where the value of the sigmoid function is approximately 0 when x is less than or equal to −5 and is approximately 1 when x is greater than or equal to 5.

14. A secret logistic regression calculation method in which m is assumed to be an integer greater than or equal to 1, η is assumed to be a real number that satisfies 0<η<1, and Sigmoid([[x]]) is assumed to be a function that calculates, from a share [[x]] of an input value x, a share of a value of a sigmoid function for the input value x using the secret sigmoid function calculation method according to claim 13, and the secret logistic regression calculation method is a secret logistic regression calculation method by which a secret logistic regression calculation system configured with three or more secret logistic regression calculation apparatuses with circuitry that calculates a share [[$\vec{w}$]] of a model parameter $\vec{w}$ of a logistic regression model from a share [[$\vec{x_i}$]](0≤i≤m−1) of data $\vec{x_i}$ on an explanatory variable and a share [[$y_i$]] (0≤i≤m−1) of data $y_i$ on a response variable, the secret logistic regression calculation method comprising:

an error calculating step in which, for i=0, . . . , m−1, the secret logistic regression calculation system calculates [[$b_i$]] by [[$b_i$]]=hpsum([[$\vec{w_t}$]], [[(1, $\vec{x_i}$)]]) from a share [[$\vec{w_t}$]] of a value $\vec{w_t}$ of the model parameter $\vec{w}$ obtained as a result of t updates and the share [[$\vec{x_i}$]], calculates [[$c_i$]] by [[$c_i$]]=Sigmoid([[$b_i$]]) from the [[$b_i$]], and calculates an error [[$d_i$]] by [[$d_i$]]=[[$c_i$]]− [[$y_i$]] from the share [[$y_i$]] and the [[$c_i$]]; and a model parameter updating step in which, for j=0, . . . , η, the secret logistic regression calculation system calculates [[e]] by [[e]]=$\sum_{i=0}^{m-1}$[[$d_i$]][[$x_{i,j}$]] from the error [[$d_i$]](0≤i≤m−1) and a j-th element [[$x_{i,j}$]](0≤i≤m− 1) of the share [[$\vec{x_i}$]] and calculates, from a j-th element $[[w_{j,t}]]$ of the share $[[w_t^{\rightarrow}]]$ and the $[[e]]$, a j-th element $[[w_{j,t+1}]]$ of a share $[[w_{t+1}^{\rightarrow}]]$ of a value $w_{t+1}^{\rightarrow}$ of the model parameter $w^{\rightarrow}$ obtained as a result of t+1 updates by $[[w_{j,t+1}]]=[[w_{j,t}]]-\eta(1/m)[[e]]$.

15. A non-transitory computer-readable storage medium which stores a program for making a computer function as the secret sigmoid function calculation apparatus according to claim 11.

* * * * *

UNITED STATES PATENT AND TRADEMARK OFFICE
CERTIFICATE OF CORRECTION

PATENT NO.        : 12,081,655 B2
APPLICATION NO.   : 17/281245
DATED             : September 3, 2024
INVENTOR(S)       : Ibuki Mishina et al.

Page 1 of 5

It is certified that error appears in the above-identified patent and that said Letters Patent is hereby corrected as shown below:

In the Claims

Column 12, Line 40 in Claim 1, "$t_o$ and $t_i$ are assumed to be real numbers" should be changed to -- $t_0$ and $t_1$ are assumed to be real numbers --.

Column 12, Line 40 in Claim 1, "that satisfy $t_o < t_i$" should be changed to -- that satisfy $t_0 < t_1$ --.

Column 12, Line 51 in Claim 1, "[[c]] = less than([[x]], $t_i$)" should be changed to -- [[c]] = less_than([[x]], $t_1$) --.

Column 12, Line 53 in Claim 1, "[[d]] = greater than([[x]], $t_o$)" should be changed to -- [[d]] = greater_than([[x]], $t_0$) --.

Column 12, Line 54 in Claim 1, "first logical comparing circuitry" should be changed to -- first logical calculating circuitry --.

Column 12, Line 57 in Claim 1, "second comparing circuitry" should be changed to -- second logical calculating circuitry --.

Column 12, Line 60 in Claim 1, "function value comparing circuitry" should be changed to -- function value calculating circuitry --.

Column 12, Line 65 in Claim 1, "the values of a, b, $t_o$, and $t_i$" should be changed to -- the values of a, b, $t_0$, and $t_1$ --.

Column 13, Line 1 in Claim 1, "the values of $t_o$ and $t_i$ are determined" should be changed to -- the values of $t_0$ and $t_1$ are determined --.

Column 13, Line 1 in Claim 1, "$-5 < t_o$ and $t_i < 5$" should be changed to -- $-5 < t_0$ and $t_1 < 5$ --.

Signed and Sealed this
Fifteenth Day of April, 2025

Coke Morgan Stewart
*Acting Director of the United States Patent and Trademark Office*

Column 13, Line 30 in Claim 2, "$[[e]] = \Sigma_{i=0}^{m-1}[[d_i]][[x_{i,y}]]$" should be changed to -- $[[e]] = \Sigma_{i=0}^{m-1}[[d_i]][[x_{i,j}]]$ --.

Column 13, Line 32 in Claim 2, "calculate, from a j-th element $[[w_{j,t}]]$, of the share $[[\vec{w_t}]]$" should be changed to -- calculate, from a j-th element $[[w_{j,t}]]$ of the share $[[\vec{w_t}]]$ --.

Column 13, Line 38 in Claim 3, "$t_o$ and $t_i$ are assumed to be real numbers" should be changed to -- $t_0$ and $t_1$ are assumed to be real numbers --.

Column 13, Line 38 in Claim 3, "that satisfy $t_o < t_i$" should be changed to -- that satisfy $t_0 < t_1$ --.

Column 13, Line 51 in Claim 3, "$[[c]]$ = less than($[[x]]$, $t_i$)" should be changed to -- $[[c]]$ = less_than($[[x]]$, $t_1$) --.

Column 13, Line 53 in Claim 3, "$[[d]]$ = greater than($[[x]]$, $t_o$)" should be changed to -- $[[d]]$ = greater_than($[[x]]$, $t_0$) --.

Column 13, Line 54 in Claim 3, "first logical comparing circuitry" should be changed to -- first logical calculating circuitry --.

Column 13, Line 56 in Claim 3, "second logical comparing circuitry" should be changed to -- second logical calculating circuitry --.

Column 13, Line 57 in Claim 3, "generate second logical computation result $[[k]]$" should be changed to -- generate a second logical computation result $[[k]]$ --.

Column 13, Line 65 in Claim 3, "the values of a, b, $t_o$, and $t_i$ are determined" should be changed to -- the values of a, b, $t_0$, and $t_1$ are determined --.

Column 14, Line 1 in Claim 3, "the values of $t_o$ and $t_0$ are determined" should be changed to -- the values of $t_0$ and $t_1$ are determined --.

Column 14, Line 1 in Claim 3, "-5 < $t_o$ and $t_i$ < 5" should be changed to -- -5 < $t_0$ and $t_1$ < 5 --.

Column 14, Line 36 in Claim 4, "$[[E]] = \Sigma_{i=0}^{m-1}[[d_i]][[x_{i,j}]]$" should be changed to -- $[[e]] = \Sigma_{i=0}^{m-1}[[d_i]][[x_{i,j}]]$ --.

Column 14, Line 44 in Claim 5, "$t_o$ and $t_i$ are assumed to be real numbers" should be changed to -- $t_0$ and $t_1$ are assumed to be real numbers --.

Column 14, Line 44 in Claim 5, "that satisfy $t_o < t_i$" should be changed to -- that satisfy $t_0 < t_1$ --.

Column 14, Line 47 in Claim 5, "by which a secret sigmoid function calculation with" should be changed to -- by which a secret sigmoid function calculation system configured with --.

Column 14, Line 57 in Claim 5, "by $[[c]]$, $t_i$)" should be changed to -- by $[[c]]$ = less_than($[[x]]$, $t_1$) --.

CERTIFICATE OF CORRECTION (continued)
U.S. Pat. No. 12,081,655 B2

Column 14, Line 60 in Claim 5, "[[d]] = greater than([[x]], $t_o$)" should be changed to -- [[d]] = greater_than([[x]], $t_0$) --.

Column 14, Line 66 in Claim 5, "[[k]] = and([[c]] ≠ [[d]])" should be changed to -- [[k]] = and([[c]], [[d]]) --.

Column 14, Line 67 in Claim 5, "the first comparison result |ci|" should be changed to -- the first comparison result [[c]] --.

Column 15, Line 3 in Claim 5, "calculates the share [[a'(x)]]" should be changed to -- calculates the share [[σ'(x)]] --.

Column 15, Line 4 in Claim 5, "[[6'(x)]] = mul([[k]] ≠ [[g(x)]])+[[e]]" should be changed to -- [[σ'(x)]] = mul([[k]], [[g(x)]])+[[e]] --.

Column 15, Line 7 in Claim 5, "the values of a, b, $t_o$, and $t_i$ are determined" should be changed to -- the values of a, b, $t_0$, and $t_1$ are determined --.

Column 15, Line 9 in Claim 5, "the values of $t_o$ and $t_i$ are determined" should be changed to -- the values of $t_0$ and $t_1$ are determined --.

Column 15, Line 10 in Claim 5, "-5 < $t_o$ and $t_i$ < 5" should be changed to -- -5 < $t_0$ and $t_1$ < 5 --.

Column 15, Line 37 in Claim 6, "the share [[$x_i$]]" should be changed to -- the share [[$\vec{x_i}$]] --.

Column 15, Line 41 in Claim 6, "model parameter updating step" should be changed to -- a model parameter updating step --.

Column 15, Line 41 in Claim 6, "for j = 0, ..., η" should be changed to -- for j = 0, ..., n --.

Column 15, Line 44 in Claim 6, "a j-th element [[$x_{i,j}$]] (0 ≤ i ≤ m-1) of the share [[$\vec{x_i}$]] of a value $\vec{w_{t+1}}$ of the model parameter $\vec{w}$" should be changed to -- a j-th element [[$x_{i,j}$]] (0 ≤ i ≤ m-1) of the share [[$\vec{x_i}$]] and calculates, from a j-th element [[$w_{j,t}$]] of the share [[$\vec{w_t}$]] and the [[e]], a j-th element [[$w_{j,t+1}$]] of a share [[$\vec{w_{t+1}}$]] of a value $\vec{w_{t+1}}$ of the model parameter $\vec{w}$ --.

Column 15, Line 57 in Claim 9, "$t_o$ and $t_i$ are assumed to be real numbers" should be changed to -- $t_0$ and $t_1$ are assumed to be real numbers --.

Column 15, Line 57 in Claim 9, "that satisfy $t_o$ < $t_i$" should be changed to -- that satisfy $t_0$ < $t_1$ --.

Column 15, Line 67 in Claim 9, "a first comparison result by [[c]][[c]]" should be changed to -- a first comparison result [[c]] by [[c]] --.

Column 16, Line 1 in Claim 9, "[[c]] = less than([[x]], $t_i$)" should be changed to -- [[c]] = less_than([[x]], $t_1$) --.

CERTIFICATE OF CORRECTION (continued)
U.S. Pat. No. 12,081,655 B2

Column 16, Line 3 in Claim 9, "[[d]] = greater than([[x]], $t_o$)" should be changed to -- [[d]] = greater_than([[x]], $t_0$) --.

Column 16, Line 4 in Claim 9, "first logical comparing circuitry" should be changed to -- first logical calculating circuitry --.

Column 16, Line 6 in Claim 9, "second comparing circuitry" should be changed to -- second logical calculating circuitry --.

Column 16, Line 10 in Claim 9, "function value comparing circuitry" should be changed to -- function value calculating circuitry --.

Column 16, Line 16 in Claim 9, "the values of $t^o$ and $t^i$ are determined" should be changed to -- the values of $t_0$ and $t_1$ are determined --.

Column 16, Line 17 in Claim 9, "$t^o$ =-2 and $t^i$=2" should be changed to -- $t_0$=-2 and $t_1$=2 --.

Column 16, Line 24 in Claim 10, "n is assumed to be a real number" should be changed to -- $\eta$ is assumed to be a real number --.

Column 16, Line 32 in Claim 10, "calculates a share [[$w^{43}$]]" should be changed to -- calculates a share [[$w^{\rightarrow}$]] --.

Column 16, Line 56 in Claim 11, "$t_o$ and $t_i$ are assumed to be real numbers" should be changed to -- $t_0$ and $t_1$ are assumed to be real numbers --.

Column 16, Line 56 in Claim 11, "that satisfy $t_o < t_i$" should be changed to -- that satisfy $t_0 < t_1$ --.

Column 17, Line 2 in Claim 11, "[[c]] = less than([[x]], $t_i$)" should be changed to -- [[c] = less_than([[x]], $t_1$) --.

Column 17, Line 4 in Claim 11, "[[d]] = greater than([[x]], $t_o$)" should be changed to -- [[d]] = greater_than([[x]], $t_0$) --.

Column 17, Line 5 in Claim 11, "first logical comparing circuitry" should be changed to -- first logical calculating circuitry --.

Column 17, Line 7 in Claim 11, "second logical comparing circuitry" should be changed to -- second logical calculating circuitry --.

Column 17, Line 12 in Claim 11, "calculate the share [[6'(x)]]" should be changed to -- calculate the share [[$\sigma'(x)$]] --.

Column 17, Line 15 in Claim 11, "Wherein" should be changed to -- , wherein --.

CERTIFICATE OF CORRECTION (continued)
U.S. Pat. No. 12,081,655 B2

Column 17, Line 19 in Claim 11, "the values of $t_o$ and $t_i$ are determined" should be changed to -- the values of $t_0$ and $t_1$ are determined --.

Column 17, Line 20 in Claim 11, "$t_o$=-2 and $t_i$=2" should be changed to -- $t_0$=-2 and $t_1$=2 --.

Column 17, Line 40 in Claim 12, "calculates a share of a model parameter $\vec{w}$" should be changed to -- calculates a share $[[\vec{w}]]$ of a model parameter $\vec{w}$ --.

Column 17, Line 56 in Claim 12, "for j = 0, ..., η" should be changed to -- for j = 0, ..., n --.

Column 17, Line 59 in Claim 12, "from a j-th element $[[w_{j,t}]]$ of the share $[[\vec{w_t}]]$ and the," should be changed to -- from a j-th element $[[w_{j,t}]]$ of the share $[[\vec{w_t}]]$ and the $[[e]]$, --.

Column 17, Line 64 in Claim 13 "$t_o$ and $t_i$ are assumed to be real numbers" should be changed to -- $t_0$ and $t_1$ are assumed to be real numbers --.

Column 17, Line 64 in Claim 13, "that satisfy $t_o < t_i$" should be changed to -- that satisfy $t_0 < t_1$ --.

Column 18, Line 10 in Claim 13, "$[[c]]$ = less than($[[x]]$, $t_i$)" should be changed to -- $[[c]]$ = less_than($[[x]]$, $t_1$) --.

Column 18, Line 13 in Claim 13, "$[[d]]$ = greater than($[[x]]$, $t_o$)" should be changed to -- $[[d]]$ = greater_than($[[x]]$, $t_0$) --.

Column 18, Line 19 in Claim 13, "$[[k]]$ = and($[[c]] \neq [[d]]$)" should be changed to -- $[[k]]$ = and($[[c]]$, $[[d]]$) --.

Column 18, Line 20 in Claim 13, "the first comparison result |ci|" should be changed to -- the first comparison result $[[c]]$ --.

Column 18, Line 23 in Claim 13, "calculates the share $[[a'(x)]]$" should be changed to -- calculates the share $[[\sigma'(x)]]$ --.

Column 18, Line 24 in Claim 13, "$[[6'(x)]]$ = mul($[[k]] \neq [[g(x)]]$)+$[[e]]$" should be changed to -- $[[\sigma'(x)]]$ = mul($[[k]]$, $[[g(x)]]$)+$[[e]]$ --.

Column 18, Line 30 in Claim 13, "the values of $t_o$ and $t_i$ are determined" should be changed to -- the values of $t_0$ and $t_1$ are determined --.

Column 18, Line 31 in Claim 13, "$t_o$=-2 and $t_i$=2" should be changed to -- $t_0$=-2 and $t_1$=2 --.

Column 18, Line 64 in Claim 14, "for j = 0, ..., η" should be changed to -- for j = 0, ..., n --.